(12) United States Patent
Croy et al.

(10) Patent No.: US 7,907,551 B2
(45) Date of Patent: Mar. 15, 2011

(54) VOICE OVER INTERNET PROTOCOL (VOIP) LOCATION BASED 911 CONFERENCING

(75) Inventors: Jon Croy, Seattle, WA (US); John Gordon Hines, Kirkland, WA (US); Darrin Johnson, Monroe, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 170 days.

(21) Appl. No.: 11/503,912

(22) Filed: Aug. 15, 2006

(65) Prior Publication Data

US 2007/0092070 A1 Apr. 26, 2007

Related U.S. Application Data

(60) Provisional application No. 60/733,789, filed on Nov. 7, 2005, provisional application No. 60/723,960, filed on Oct. 6, 2005, provisional application No. 60/723,961, filed on Oct. 6, 2005.

(51) Int. Cl.
*H04L 12/16* (2006.01)

(52) U.S. Cl. ........................................ 370/261; 370/266

(58) Field of Classification Search ........................ None
See application file for complete search history.

(56) References Cited

U.S. PATENT DOCUMENTS

| | | |
|---|---|---|
| 1,103,073 A | 7/1914 | O'Connell |
| 4,445,118 A | 4/1984 | Taylor |
| 4,494,119 A | 1/1985 | Wimbush |
| 4,651,156 A | 3/1987 | Martinez |
| 4,706,275 A | 11/1987 | Kamil |
| 4,891,638 A | 1/1990 | Davis |
| 4,891,650 A | 1/1990 | Sheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |

(Continued)

OTHER PUBLICATIONS

Yilin Zhao, Efficient and reliable data transmission for cellular-and-GPS-based mayday systems, Nov. 1997, IEEE, IEEE Conference on Intelligent Transportation System, 1997. ITSC 97, 555-559.*

(Continued)

*Primary Examiner* — Jayanti K Patel
*Assistant Examiner* — Hooman Houshmand
(74) *Attorney, Agent, or Firm* — William H. Bollman (57) ABSTRACT

Voice Over Internet Protocol (VoIP) emergency calls to an Emergency Response Center (ERC) are handled through a VoIP conference bridge on a VoIP service provider's soft switch. The soft switch works with a VoIP positioning center (VPC) to obtain location information, which is compared against a PSAP database to find an initial best-appropriate PSAP for the location of the emergency caller. The PSAP is issued an Invite message to join the conference, establishing an emergency call. Third parties such as police, ambulance may be issued Invite messages to join the conference. Cold transfers are avoided by Inviting participants to join a single emergency conference rather than passing an emergency call from party to party (e.g., from PSAP to police to ambulance, etc.) The PSAP, other emergency responders, and even the initial VoIP emergency caller may leave and rejoin the VoIP conference without dropping the conference between the others.

9 Claims, 7 Drawing Sheets

U.S. PATENT DOCUMENTS

| | | | |
|---|---|---|---|
| 5,081,667 | A | 1/1992 | Drori |
| 5,119,104 | A | 6/1992 | Heller |
| 5,126,722 | A | 6/1992 | Kamis |
| 5,144,283 | A | 9/1992 | Arens |
| 5,161,180 | A | 11/1992 | Chavous |
| 5,166,972 | A * | 11/1992 | Smith ............................ 379/49 |
| 5,177,478 | A | 1/1993 | Wagai |
| 5,193,215 | A | 3/1993 | Olmer |
| 5,208,756 | A | 5/1993 | Song |
| 5,214,789 | A | 5/1993 | George |
| 5,218,367 | A | 6/1993 | Sheffer |
| 5,223,844 | A | 6/1993 | Mansell |
| 5,239,570 | A | 8/1993 | Koster |
| 5,265,630 | A | 11/1993 | Hartmann |
| 5,266,944 | A | 11/1993 | Carroll |
| 5,283,570 | A | 2/1994 | DeLuca |
| 5,289,527 | A | 2/1994 | Tiedemann |
| 5,293,642 | A | 3/1994 | Lo |
| 5,299,132 | A | 3/1994 | Wortham |
| 5,301,354 | A | 4/1994 | Schwendeman |
| 5,311,516 | A | 5/1994 | Kuznicke |
| 5,325,302 | A | 6/1994 | Izidon |
| 5,327,529 | A | 7/1994 | Fults |
| 5,334,974 | A | 8/1994 | Simms |
| 5,335,246 | A | 8/1994 | Yokev |
| 5,343,493 | A | 8/1994 | Karimulah |
| 5,347,568 | A | 9/1994 | Moody |
| 5,351,235 | A | 9/1994 | Lahtinen |
| 5,361,212 | A | 11/1994 | Class |
| 5,363,425 | A | 11/1994 | Mufti |
| 5,365,451 | A | 11/1994 | Wang |
| 5,374,936 | A | 12/1994 | Feng |
| 5,379,451 | A | 1/1995 | Nakagoshi |
| 5,381,338 | A | 1/1995 | Wysocki |
| 5,387,993 | A | 2/1995 | Heller |
| 5,388,147 | A | 2/1995 | Grimes |
| 5,390,339 | A | 2/1995 | Bruckery |
| 5,394,158 | A | 2/1995 | Chia |
| 5,396,227 | A | 3/1995 | Carroll et al. |
| 5,398,190 | A | 3/1995 | Wortham |
| 5,406,614 | A | 4/1995 | Hara |
| 5,418,537 | A | 5/1995 | Bird |
| 5,422,813 | A | 6/1995 | Schuchman |
| 5,423,076 | A | 6/1995 | Westergren |
| 5,434,789 | A | 7/1995 | Fraker |
| 5,454,024 | A | 9/1995 | Lebowitz |
| 5,461,390 | A | 10/1995 | Hosher |
| 5,470,233 | A | 11/1995 | Fruchterman |
| 5,479,408 | A | 12/1995 | Will |
| 5,479,482 | A | 12/1995 | Grimes |
| 5,485,161 | A | 1/1996 | Vaughn |
| 5,485,163 | A | 1/1996 | Singer |
| 5,488,563 | A | 1/1996 | Chazelle |
| 5,494,091 | A | 2/1996 | Freeman |
| 5,497,149 | A | 3/1996 | Fast |
| 5,504,491 | A | 4/1996 | Chapman |
| 5,506,886 | A | 4/1996 | Maine |
| 5,508,931 | A | 4/1996 | Snider |
| 5,513,243 | A | 4/1996 | Kage |
| 5,515,287 | A | 5/1996 | Hakoyama |
| 5,517,199 | A | 5/1996 | DiMattei |
| 5,519,403 | A | 5/1996 | Bickley |
| 5,530,655 | A | 6/1996 | Lokhoff |
| 5,530,914 | A | 6/1996 | McPheters |
| 5,532,690 | A | 7/1996 | Hertel |
| 5,535,434 | A | 7/1996 | Siddoway |
| 5,539,395 | A | 7/1996 | Buss |
| 5,539,398 | A | 7/1996 | Hall |
| 5,539,829 | A | 7/1996 | Lokhoff |
| 5,543,776 | A | 8/1996 | L'Esperance |
| 5,546,445 | A | 8/1996 | Dennison |
| 5,552,772 | A | 9/1996 | Janky |
| 5,555,286 | A | 9/1996 | Tendler |
| 5,568,119 | A | 10/1996 | Schipper |
| 5,568,153 | A | 10/1996 | Beliveau |
| 5,574,648 | A | 11/1996 | Pilley |
| 5,579,372 | A | 11/1996 | Angstrom |
| 5,588,009 | A | 12/1996 | Will |
| 5,592,535 | A | 1/1997 | Klotz |
| 5,594,780 | A | 1/1997 | Wiedeman |
| 5,604,486 | A | 2/1997 | Lauro |
| 5,606,313 | A | 2/1997 | Allen |
| 5,606,618 | A | 2/1997 | Lokhoff |
| 5,606,850 | A | 3/1997 | Nakamura |
| 5,610,815 | A | 3/1997 | Gudat |
| 5,614,890 | A | 3/1997 | Fox |
| 5,615,116 | A | 3/1997 | Gudat |
| 5,621,793 | A | 4/1997 | Bednarek |
| 5,628,051 | A | 5/1997 | Salin |
| 5,629,693 | A | 5/1997 | Janky |
| 5,633,912 | A | 5/1997 | Tsoi |
| 5,636,276 | A | 6/1997 | Brugger |
| 5,661,652 | A | 8/1997 | Sprague |
| 5,661,755 | A | 8/1997 | Van de Kerkhof |
| 5,682,600 | A | 10/1997 | Salin |
| 5,689,245 | A | 11/1997 | Noreen |
| 5,699,053 | A | 12/1997 | Jonsson |
| 5,731,785 | A | 3/1998 | Lemelson |
| 5,740,534 | A | 4/1998 | Ayerst |
| 5,761,618 | A | 6/1998 | Lynch |
| 5,765,152 | A | 6/1998 | Erickson |
| 5,767,795 | A | 6/1998 | Schaphorst |
| 5,768,509 | A | 6/1998 | Gunluk |
| 5,771,353 | A | 6/1998 | Eggleston |
| 5,774,533 | A | 6/1998 | Patel |
| 5,774,670 | A | 6/1998 | Montulli |
| 5,787,357 | A | 7/1998 | Salin |
| 5,794,142 | A | 8/1998 | Vantilla |
| 5,797,094 | A | 8/1998 | Houde |
| 5,797,096 | A | 8/1998 | Lupien |
| 5,802,492 | A | 9/1998 | DeLorrme |
| 5,806,000 | A | 9/1998 | Vo |
| 5,809,415 | A | 9/1998 | Rossman |
| 5,812,086 | A | 9/1998 | Bertiger |
| 5,812,087 | A | 9/1998 | Krasner |
| 5,822,700 | A | 10/1998 | Hult |
| 5,828,740 | A | 10/1998 | Khue |
| 5,841,396 | A | 11/1998 | Krasner |
| 5,857,201 | A | 1/1999 | Wright, Jr. |
| 5,864,667 | A | 1/1999 | Barkam |
| 5,874,914 | A | 2/1999 | Krasner |
| 5,896,369 | A | 4/1999 | Warsta |
| 5,920,821 | A | 7/1999 | Seaholtz |
| 5,922,074 | A | 7/1999 | Richard |
| 5,930,250 | A | 7/1999 | Klok |
| 5,953,398 | A | 9/1999 | Hill |
| 5,960,362 | A | 9/1999 | Grob |
| 5,974,054 | A | 10/1999 | Couts |
| 5,978,685 | A | 11/1999 | Laiho |
| 5,983,099 | A | 11/1999 | Yao |
| 5,987,323 | A | 11/1999 | Houtari |
| 5,998,111 | A | 12/1999 | Abe |
| 5,999,124 | A | 12/1999 | Sheynblat |
| 6,014,602 | A | 1/2000 | Kithol |
| 6,032,051 | A | 2/2000 | Hall |
| 6,035,025 | A | 3/2000 | Hanson |
| 6,049,710 | A | 4/2000 | Nilsson |
| 6,052,081 | A | 4/2000 | Krasner |
| 6,058,300 | A | 5/2000 | Hanson |
| 6,058,338 | A | 5/2000 | Agashe |
| 6,061,018 | A | 5/2000 | Sheynblat |
| 6,061,346 | A | 5/2000 | Nordman |
| 6,064,336 | A | 5/2000 | Krasner |
| 6,064,875 | A | 5/2000 | Morgan |
| 6,067,045 | A | 5/2000 | Castelloe |
| 6,070,067 | A | 5/2000 | Nguyen |
| 6,075,982 | A | 6/2000 | Donovan |
| 6,081,229 | A | 6/2000 | Soliman |
| 6,081,508 | A | 6/2000 | West |
| 6,085,320 | A | 7/2000 | Kaliski, Jr. |
| 6,101,378 | A | 8/2000 | Barabash |
| 6,122,503 | A | 9/2000 | Daly |
| 6,122,520 | A | 9/2000 | Want |
| 6,124,810 | A | 9/2000 | Segal |
| 6,131,067 | A | 10/2000 | Girerd |
| 6,133,874 | A | 10/2000 | Krasner |
| 6,134,483 | A | 10/2000 | Vayanos |

| Patent | Date | Name |
|---|---|---|
| 6,148,197 A | 11/2000 | Bridges |
| 6,148,198 A | 11/2000 | Anderson |
| 6,149,353 A | 11/2000 | Nilsson |
| 6,150,980 A | 11/2000 | Krasner |
| 6,154,172 A | 11/2000 | Piccionelli |
| 6,169,891 B1 | 1/2001 | Gorham |
| 6,169,901 B1 | 1/2001 | Boucher |
| 6,169,902 B1 | 1/2001 | Kawamoto |
| 6,173,181 B1 | 1/2001 | Losh |
| 6,178,505 B1 | 1/2001 | Schnieder |
| 6,178,506 B1 | 1/2001 | Quick, Jr. |
| 6,181,935 B1 | 1/2001 | Gossman |
| 6,188,354 B1 | 2/2001 | Soliman |
| 6,188,752 B1 | 2/2001 | Lesley |
| 6,188,909 B1 | 2/2001 | Alananra |
| 6,189,098 B1 | 2/2001 | Kaliski, Jr. |
| 6,195,557 B1 | 2/2001 | Havinis |
| 6,198,431 B1 | 3/2001 | Gibson |
| 6,199,045 B1 | 3/2001 | Giniger |
| 6,199,113 B1 | 3/2001 | Alegre |
| 6,205,330 B1 | 3/2001 | Windbladh |
| 6,208,290 B1 | 3/2001 | Krasner |
| 6,208,854 B1 | 3/2001 | Roberts |
| 6,215,441 B1 | 4/2001 | Moeglein |
| 6,219,557 B1 | 4/2001 | Havinis |
| 6,223,046 B1 | 4/2001 | Hamill-Keays |
| 6,226,529 B1 | 5/2001 | Bruno |
| 6,239,742 B1 | 5/2001 | Krasner |
| 6,247,135 B1 | 6/2001 | Feaugue |
| 6,249,680 B1 | 6/2001 | Wax |
| 6,249,744 B1 | 6/2001 | Morita |
| 6,249,873 B1 | 6/2001 | Richard |
| 6,253,203 B1 | 6/2001 | O'Flaherty |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,289,373 B1 | 9/2001 | Dezonno |
| 6,297,768 B1 | 10/2001 | Allen, Jr. |
| 6,307,504 B1 | 10/2001 | Sheynblat |
| 6,308,269 B2 | 10/2001 | Proidl |
| 6,313,786 B1 | 11/2001 | Sheynblat |
| 6,317,594 B1 | 11/2001 | Gossman |
| 6,321,091 B1 | 11/2001 | Holland |
| 6,321,257 B1 | 11/2001 | Kotola |
| 6,324,542 B1 | 11/2001 | Wright |
| 6,327,473 B1 | 12/2001 | Soliman |
| 6,327,479 B1 | 12/2001 | Mikkola |
| 6,333,919 B2 | 12/2001 | Gaffney |
| 6,360,093 B1 | 3/2002 | Ross |
| 6,363,254 B1 | 3/2002 | Jones |
| 6,367,019 B1 | 4/2002 | Ansell |
| 6,370,389 B1 | 4/2002 | Isomursu |
| 6,377,209 B1 | 4/2002 | Krasner |
| 6,400,314 B1 | 6/2002 | Krasner |
| 6,400,958 B1 | 6/2002 | Isomursu |
| 6,421,002 B2 | 7/2002 | Krasner |
| 6,433,734 B1 | 8/2002 | Krasner |
| 6,434,381 B1 | 8/2002 | Moore |
| 6,442,391 B1 | 8/2002 | Johansson |
| 6,449,473 B1 | 9/2002 | Raivisto |
| 6,449,476 B1 | 9/2002 | Hutchison, IV |
| 6,456,852 B2 | 9/2002 | Bar |
| 6,463,272 B1 | 10/2002 | Wallace |
| 6,477,150 B1 | 11/2002 | Maggenti |
| 6,504,491 B1 | 1/2003 | Christians |
| 6,505,049 B1 | 1/2003 | Dorenbosch |
| 6,510,387 B2 | 1/2003 | Fuchs |
| 6,512,922 B1 | 1/2003 | Burg |
| 6,512,930 B2 | 1/2003 | Sandegren |
| 6,515,623 B2 | 2/2003 | Johnson |
| 6,519,466 B2 | 2/2003 | Pande |
| 6,522,682 B1 | 2/2003 | Kohli |
| 6,529,829 B2 | 3/2003 | Turetzky |
| 6,531,982 B1 | 3/2003 | White |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda |
| 6,542,734 B1 | 4/2003 | Abrol |
| 6,542,743 B1 | 4/2003 | Soliman |
| 6,549,776 B1 | 4/2003 | Joong |
| 6,549,844 B1 | 4/2003 | Egberts |
| 6,556,832 B1 | 4/2003 | Soliman |
| 6,560,461 B1 | 5/2003 | fomukong |
| 6,560,534 B2 | 5/2003 | Abraham |
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,552 B1 | 6/2003 | Kuno |
| 6,594,500 B2 | 7/2003 | Bender |
| 6,597,311 B2 | 7/2003 | Sheynblat |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,670 B1 | 9/2003 | Chansarkar |
| 6,621,452 B2 | 9/2003 | Knockeart |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,680,694 B1 | 1/2004 | Knockeart |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,720,915 B2 | 4/2004 | Sheynblat |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,411,254 B1 | 6/2004 | Moeglein |
| 6,744,856 B2 | 6/2004 | Karnik |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,544 B2 | 6/2004 | Rangarajan |
| 6,771,742 B2 | 8/2004 | McCalmont |
| 6,772,340 B1 | 8/2004 | Peinado |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,699 B1 | 9/2004 | McCraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |

| Patent | Date | Name |
|---|---|---|
| 6,816,111 B2 | 11/2004 | Krasner |
| 6,816,710 B2 | 11/2004 | Krasner |
| 6,816,719 B1 | 11/2004 | Heinonen |
| 6,816,734 B2 | 11/2004 | Wong |
| 6,820,269 B2 | 11/2004 | Baucke |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,842,715 B1 | 1/2005 | Gaal |
| 6,847,618 B2 * | 1/2005 | Laursen et al. ............... 370/261 |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 * | 4/2005 | Summers et al. ........ 379/202.01 |
| 6,882,850 B2 | 4/2005 | McConnell et al. |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 * | 6/2005 | Salkini et al. ................ 370/466 |
| 6,912,395 B2 | 6/2005 | Benes |
| 6,912,545 B1 | 6/2005 | Lundy |
| 6,915,208 B2 | 7/2005 | Garin |
| 6,917,331 B2 | 7/2005 | Gronemeyer |
| 6,930,634 B2 | 8/2005 | Peng |
| 6,937,187 B2 | 8/2005 | Van Diggelen |
| 6,937,872 B2 | 8/2005 | Krasner |
| 6,940,826 B1 * | 9/2005 | Simard et al. ................ 370/260 |
| 6,940,950 B2 | 9/2005 | Dickinson |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,993,355 B1 * | 1/2006 | Pershan ...................... 455/518 |
| 6,996,720 B1 | 2/2006 | DeMello |
| 6,999,782 B2 | 2/2006 | Shaughnessy |
| 7,024,321 B1 | 4/2006 | Deninger |
| 7,024,393 B1 | 4/2006 | Peinado |
| 7,047,411 B1 | 5/2006 | DeMello |
| 7,065,351 B2 | 6/2006 | Carter |
| 7,065,507 B2 | 6/2006 | Mohammed |
| 7,079,857 B2 | 7/2006 | Maggenti |
| 7,103,018 B1 | 9/2006 | Hansen |
| 7,103,574 B1 | 9/2006 | Peinado |
| 7,106,717 B2 | 9/2006 | Rosseau |
| 7,136,838 B1 | 11/2006 | Peinado |
| 7,151,946 B2 | 12/2006 | Maggenti |
| 7,174,153 B2 * | 2/2007 | Ehlers ...................... 455/404.2 |
| 7,209,758 B1 | 4/2007 | Moll |
| 7,209,969 B2 | 4/2007 | Lahti |
| 7,218,940 B2 | 5/2007 | Niemenna |
| 7,221,959 B2 | 5/2007 | Lindquist |
| 7,245,900 B1 | 7/2007 | Lamb |
| 7,260,384 B2 | 8/2007 | Bales |
| 7,333,480 B1 | 2/2008 | Clarke |
| 7,382,773 B2 * | 6/2008 | Schoeneberger et al. ..... 370/353 |
| 7,394,896 B2 * | 7/2008 | Norton ..................... 379/202.01 |
| 7,440,442 B2 | 10/2008 | Grabelsky |
| 2001/0011247 A1 | 8/2001 | O'Flaherty |
| 2002/0037735 A1 | 3/2002 | Maggenti |
| 2002/0052214 A1 | 5/2002 | Maggenti |
| 2002/0061760 A1 | 5/2002 | Maggenti |
| 2002/0069529 A1 | 6/2002 | Wieres |
| 2002/0102996 A1 | 8/2002 | Jenkins |
| 2002/0102999 A1 | 8/2002 | Maggenti |
| 2002/0111172 A1 | 8/2002 | DeWolf |
| 2002/0112047 A1 | 8/2002 | Kushwaha |
| 2002/0118650 A1 * | 8/2002 | Jagadeesan et al. .......... 370/260 |
| 2002/0191595 A1 * | 12/2002 | Mar et al. ..................... 370/352 |
| 2003/0009602 A1 | 1/2003 | Jacobs |
| 2003/0012148 A1 * | 1/2003 | Peters .......................... 370/260 |
| 2003/0013449 A1 | 1/2003 | Hose |
| 2003/0016804 A1 | 1/2003 | Sheha |
| 2003/0037163 A1 | 2/2003 | Kitada |
| 2003/0040272 A1 | 2/2003 | Lelievre |
| 2003/0065788 A1 | 4/2003 | Salomaki |
| 2003/0072318 A1 | 4/2003 | Lam |
| 2003/0078064 A1 | 4/2003 | Chan |
| 2003/0119521 A1 | 4/2003 | Tipnis |
| 2003/0081557 A1 | 5/2003 | Mettala |
| 2003/0101329 A1 | 5/2003 | Lahti |
| 2003/0101341 A1 | 5/2003 | Kettler |
| 2003/0103484 A1 | 6/2003 | Oommen |
| 2003/0114157 A1 | 6/2003 | Spitz |
| 2003/0119528 A1 | 6/2003 | Pew |
| 2003/0137961 A1 | 7/2003 | Tsirtsis |
| 2003/0153340 A1 | 8/2003 | Crockett |
| 2003/0153341 A1 | 8/2003 | Crockett |
| 2003/0153342 A1 | 8/2003 | Crockett |
| 2003/0153343 A1 | 8/2003 | Crockett |
| 2003/0161298 A1 | 8/2003 | Bergman |
| 2003/0196105 A1 | 10/2003 | Fineberg |
| 2003/0204640 A1 | 10/2003 | Sahineja |
| 2003/0223381 A1 | 12/2003 | Schroderus |
| 2004/0002326 A1 | 1/2004 | Maher |
| 2004/0032485 A1 | 2/2004 | Stephens |
| 2004/0044623 A1 | 3/2004 | Wake |
| 2004/0047461 A1 | 3/2004 | Weisman et al. |
| 2004/0068724 A1 | 4/2004 | Gardner |
| 2004/0098497 A1 | 5/2004 | Banet |
| 2004/0132465 A1 | 7/2004 | Mattila |
| 2004/0184584 A1 | 9/2004 | McCalmont |
| 2004/0198332 A1 | 10/2004 | Lundsgaard |
| 2004/0205151 A1 | 10/2004 | Sprigg |
| 2004/0229632 A1 | 11/2004 | Flynn |
| 2004/0242238 A1 | 12/2004 | Wang |
| 2005/0028034 A1 | 2/2005 | Gantman |
| 2005/0039178 A1 | 2/2005 | Marolia |
| 2005/0041578 A1 | 2/2005 | Huotari |
| 2005/0071671 A1 | 3/2005 | Karaoguz |
| 2005/0086467 A1 | 4/2005 | Asokan |
| 2005/0090236 A1 | 4/2005 | Schwinke |
| 2005/0107673 A1 | 5/2005 | Ball |
| 2005/0112030 A1 | 5/2005 | Gaus |
| 2005/0134504 A1 | 6/2005 | Harwood |
| 2005/0136885 A1 * | 6/2005 | Kaltsukis ................... 455/404.1 |
| 2005/0149430 A1 | 7/2005 | Williams |
| 2005/0209995 A1 | 9/2005 | Aksu |
| 2005/0232252 A1 * | 10/2005 | Hoover ........................ 370/356 |
| 2005/0259675 A1 | 11/2005 | Tuohino |
| 2005/0271029 A1 | 12/2005 | Iffland |
| 2006/0008065 A1 * | 1/2006 | Longman et al. ............. 379/158 |
| 2006/0023747 A1 | 2/2006 | Koren et al. |
| 2006/0053225 A1 | 3/2006 | Poikselka |
| 2006/0058102 A1 | 3/2006 | Nguyen et al. |
| 2006/0072729 A1 | 4/2006 | Lee et al. |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0233338 A1 | 10/2006 | Venkata |
| 2006/0234639 A1 | 10/2006 | Kushwaha |
| 2006/0234698 A1 | 10/2006 | Fok |
| 2006/0259365 A1 | 11/2006 | Agarwal et al. |
| 2007/0003024 A1 * | 1/2007 | Olivier et al. ................... 379/45 |
| 2007/0014282 A1 | 1/2007 | Mitchell |

| | | |
|---|---|---|
| 2007/0019614 A1 | 1/2007 | Hoffmann |
| 2007/0022011 A1 | 1/2007 | Altberg et al. |
| 2007/0026854 A1 | 2/2007 | Nath |
| 2007/0030539 A1 | 2/2007 | Nath |
| 2007/0115941 A1 | 5/2007 | Patel |
| 2007/0263610 A1 | 11/2007 | Mitchell |

OTHER PUBLICATIONS

Qualcomm CDMA Technologies, LBS Control Plane/User Plane Overview—80-VD378-1NP B, 2006, pp. 1-36.

Bhalla et al, TELUS, Technology Strategy—LBS Roaming Summit, Sep. 19, 2006.

Alfredo Aguirre, Ilusacell, First and Only Carrier in Mexico with a 3G CDMA Network, 2007.

Mike McMullen, Sprint, LBS Roaming Summit, Sep. 19, 2006.

Andrew Yeow, BCE, LBS Roaming Summit, Sep. 19, 2006, pp. 1-8.

Nars Haran, U.S. Cellular, Packet Data—Roaming and LBS Overview, Nov. 2, 2007, pp. 1-15.

Qualcomm CDMA Technologies, LBS Control Plane Roaming—80-VD377-1NP A, 2006, pp. 1-10.

Qualcomm CDMA Technologies, MS Resident User Plane LBS Roaming—80-VC718-1 E, 2006, pp. 1-37.

$3^{rd}$ Generation Partnership Project 2, Position Determination Service Standard for Dual Mode Spread Spectrum Systems, Feb. 16, 2001, pp. i-X, 1-1-1-5, 2-1-2-2, 3-1-3-51, 4-1-4-66, A-1-A-2, B-1-B-2, C-1-C-2, D-1-D-2.

Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.

* cited by examiner

VOICE OVER INTERNET PROTOCOL (VOIP) LOCATION BASED 911 CONFERENCING

This application is related to and claims priority from a co-pending U.S. Provisional Application No. 60/723,960, entitled "Voice Over Internet Protocol (VoIP) Location Based Conferencing", filed on Oct. 6, 2005; U.S. Provisional Application No. 60/733,789, entitled "Voice Over Internet Protocol (VoIP) Multi-User Conferencing", filed on Nov. 7, 2005; and U.S. Provisional Application No. 60/723,961, entitled "Voice Over Internet Protocol (VoIP) Location Based 911 Conferencing", filed on Oct. 6, 2005; the entirety of all three of which are expressly incorporated herein by reference.

BACKGROUND OF THE INVENTION

1. Field of the Invention

This invention relates generally to Voice Over Internet (VoIP) protocols and architectures. More particularly, it relates to location based services for the provision of 911 emergency services using VoIP protocols and architectures.

2. Background of the Related Art 911 is a phone number widely recognized in North America as an emergency phone number that is used by emergency dispatch personnel, among other things, to determine a location of a caller. Enhanced 911 (E911) is defined by the transmission of callback number and location information. E911 may be implemented for landline and/or wireless devices.

A Public Safety Answering Point (PSAP) is a dispatch office that receives 9-1-1 calls from the public. A PSAP may be a local, fire or police department, an ambulance service or a regional office covering all services. A 9-1-1 ("911") service becomes E-9-1-1 ("E911") when automatic number identification and automatic location information from a communications device (e.g. wireless phone, VoIP Phone, etc.) is provided to the 911 operator.

Voice-Over-Internet Protocol (VoIP) is a technology that emulates a phone call, but instead of using a circuit based system such as the telephone network, utilizes packetized data transmission techniques most notably implemented in the Internet. 911 calls made using VoIP technology must reach the correct PSAP, but there currently is no uniform interface to the various PSAPs for call delivery because the technology for connecting calls varies. For instance, not all PSAPs are Internet Protocol (IP) capable. Some PSAPs are accessed via ordinary public switched telephone network (PSTN) telephone lines. Some PSAPs are accessed through selective routing such as direct trunks. Still other PSAPs are accessed using IP connections. There is no uniformity among the thousands of different PSAPs.

Moreover, some Public Safety Access Points (PSAPS) are not enhanced, and thus do not receive the callback or location information at all from any phone, landline or wireless.

The use of VoIP technology is growing quickly. As people adopt voice-over-IP (VoIP) technology for routine communications, the inventors herein recognize that there is a growing need to access E911 services including provision of location information from a VoIP device.

The existing E911 infrastructure is built upon copper wire line voice technology and is not fully compatible with VoIP. Given VoIP technology, there are at least three VoIP scenarios:

1. A VoIP UA that is physically connected to a static data cable at a "home" address. For instance, an Analog Telephone Adapter (ATA) that is connected to the "home" data cable and uses traditional telephone devices.
2. A VoIP UA that is physically connected to a data cable at a location different than its "home" address. For instance, a laptop computer device utilized away from home as a VoIP software telephone would be a VoIP 'visitor' device as described by this scenario.
3. A VoIP UA that is wireless, physically disconnected from any data cable. In this situation, the VoIP UA connects to the VoIP service provider via either a wide-are wireless technology (e.g., cellular, PCS, WiMAX) or via a local-area wireless technology (e.g., Wireless Fidelity (WiFi), UWB, etc.) using a laptop computer or handheld device.

VoIP phone calls are routed to a VoIP voice gateway, from which they are passed on to their destination. A VoIP voice gateway or soft switch is a programmable network switch that can process the signaling for all types of packet protocols. Also known as a 'media gateway controller,' 'call agent,' or 'call server,' such devices are used by carriers that support converged communications services by integrating SS7 telephone signaling with packet networks. Softswitches can support, e.g., IP, DSL, ATM and frame relay.

The challenges evident with respect to determining the location of a calling VoIP telephone is perhaps most evident with respect to its use to make an emergency call (e.g., a 911 call). Nevertheless, VoIP telephone technology is quickly replacing conventional switched telephone technology. However, because VoIP is Internet Protocol (IP) based, call related information such as CallerID type services may not be available or accurate. A location of a given VoIP device may be provisioned to be at a given geographic location, or queried from a home location register (HLR) in a mobile system.

In addition, some Public Safety Access Points (PSAPs) are not enhanced, and thus do not receive the callback or location information at all from any phone; landline, cellular or VoIP.

Moreover, there is complexity in public access to Public Safety Answering Points due to lack of a Session Initiation Protocol (SIP) Uniform Resource Identifier (URI) for all PSAPs. (SIP is the IP-based protocol defined in IETF RFCs 3261 and 2543.) SIP is one of two dominant protocols used by the VoIP industry. URI is the addressing technology for identifying resources on the Internet or a private intranet. URIs were originally defined as two types: Uniform Resource Locators (URLs) which are addresses with network location, and Uniform Resource Names (URNs) which are persistent names that are address independent. Today, a URI is defined by its purpose rather than the URL vs. URN classification.) Some PSAPs are accessed only by conventional telephone line, others only by direct telephone trunk lines. Not all PSAPs are accessible via the Internet.

Figure 6:
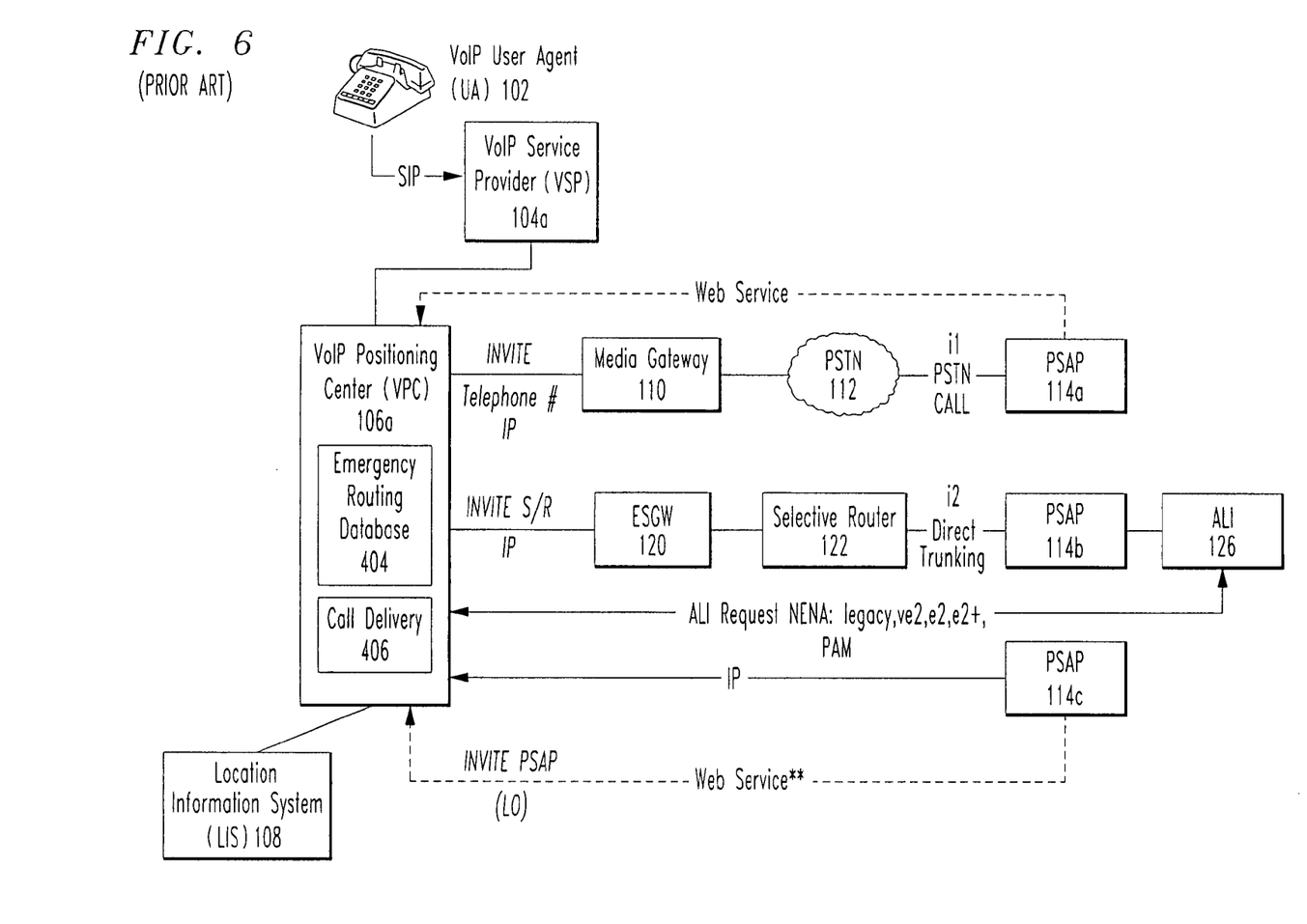
FIG. 6 shows basic conventional VoIP elements required to interconnect a VoIP emergency E911 caller to a relevant public safety access point (PSAP).

FIG. 6 shows basic conventional VoIP elements required to interconnect a VoIP emergency E911 caller to a relevant public safety access point (PSAP).

In particular, as shown in FIG. 6, VoIP telephone devices 102a, 102b, 102c (collectively referred to as 102) are connected to respective VoIP Service Provider (VSP) soft switches 104a, 104b, 104c (collectively referred to as 104) using an Internet Protocol (IP) connection, most commonly over the Internet. The VoIP service provider's soft switch 104 in turn communicates with a respective VoIP Positioning Center (VPC) 106a, 106b, 106c (collectively referred to as 106) using an appropriate IP connection. Each VSP requires use of their own VPC, as depicted in FIG. 6.

Figure 7:
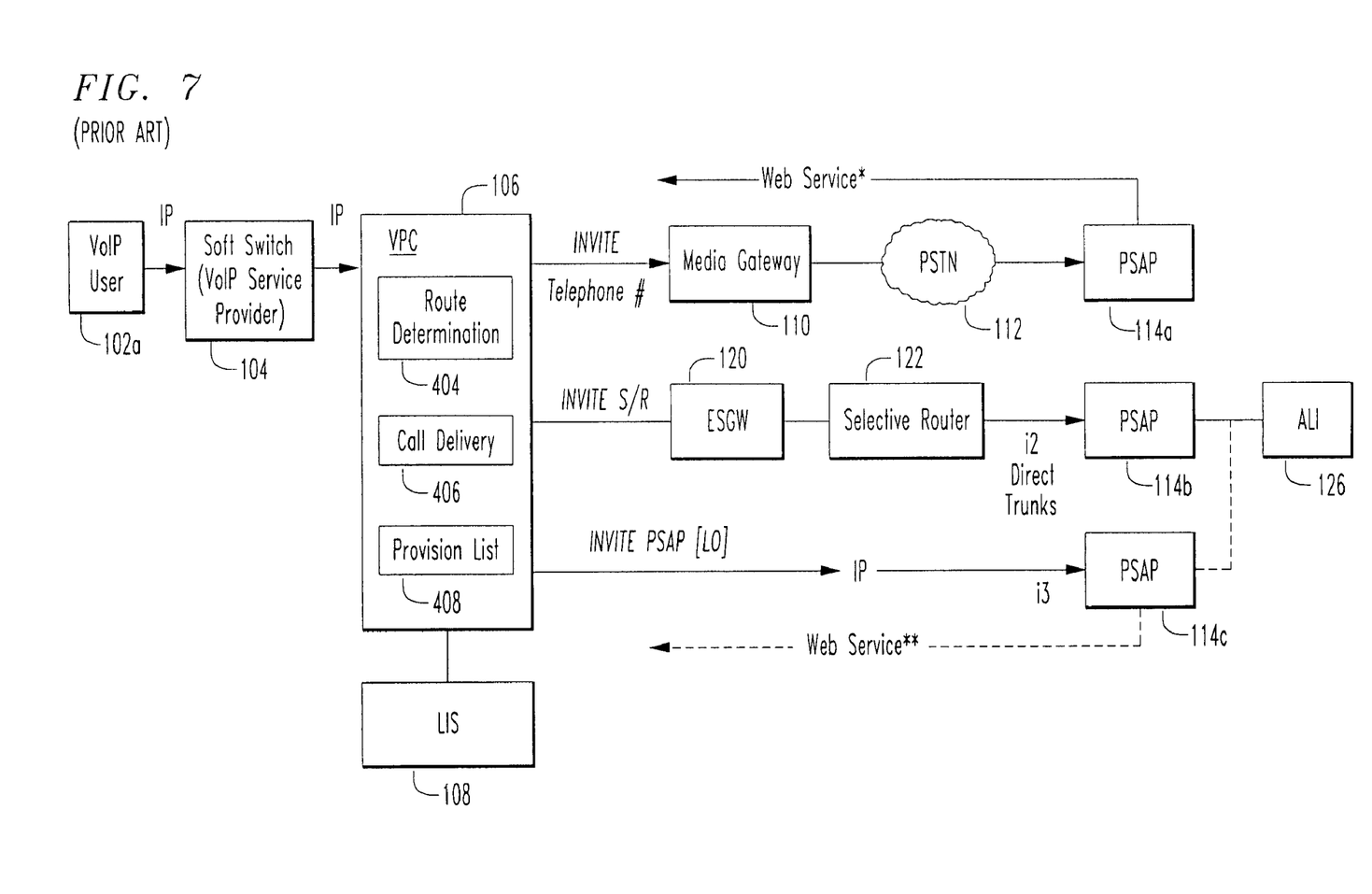
FIG. 7 shows in more detail conventional VoIP elements required to interconnect a VoIP emergency E911 caller to a relevant public safety access point (PSAP).

FIG. 7 shows in more detail conventional VoIP elements required by a VPC to interconnect a VoIP emergency E911 caller to a relevant public safety access point (PSAP).

In particular, as shown in FIG. 7, each VPC 106 comprises its own respective route determination module 404, call delivery module 406, and provisioning list 408.

A respective location information server (LIS) 108 services each of the VPCs 106. The LIS 108 is responsible for storing and providing access to the subscriber location information needed for E9-1-1 call processing (as defined by the NENA VoIP Location Working Group).

A conventional VoIP Positioning Center (VPC) 106 is a system that attempts to determine the appropriate or correct PSAP 114 that a VoIP emergency E911 call should be routed to based on the VoIP subscriber's position. The conventional VPC 106 also returns associated routing instructions to the VoIP network. The conventional VPC 106 additionally provides the caller's location and the callback number to the relevant PSAP through the automatic location identifier (ALI) (The ALI is a database that accepts a PSAP query, and using that relates a specific telephone number to a street address. In the case of an Emergency Services Query Key (ESQK), the ALI database steers the query to the appropriate VPC and steers the response back to the PSAP. An ALI is typically owned by a LEC or a PSAP.)

Further as shown in FIG. 7, each VSP route the emergency 9-1-1 call, without location object added, to their VPC 106. The VPC must determine the correct PSAP 114 (collectively represented by PSAP 114a, 114b and 114c) and route to it using the appropriate technology.

In a first scenario, the VPC 106 passes the 9-1-1 call to the PSAP 114a using an INVITE telephone number message, via a media gateway 110 that translates between the IP protocol of the INVITE message and a telephone line interface, and interfaces with the public switched telephone network (PSTN) 112.

In a second scenario, the VPC 106 passes the 9-1-1 call to the PSAP 114b using an INVITE S/R message, via an ESGW 120 and selective router 122. In this scenario, the selective router 122 is connected to the relevant PSAP 114b via direct trunks.

In a third scenario, the VPC 106 passes the 9-1-1 call to the PSAP 114c using an INVITE PSAP message, via IP, to the PSAP 114c.

In the second and third scenario, the ALI 126 must be inter-connected with each VPC 106 (a,b,c). Furthermore, each VPC is burdened with supporting all the various ALI protocols: ve2, e2, PAM, legacy NENA, etc.

Thus, as can be appreciated, an Emergency call (e.g., 911, E911) may require the involvement of one or more Response Centers (RCs), e.g., Public Safety Access Point (PSAP) in addition to the RC that initially receives the emergency call. This is because there is a possibility that the emergency call is received by a PSAP other than that which is assigned to the geographic region that the caller is currently located in.

Accordingly, the PSAP that initially answers the call may need to transfer the emergency call to the correct PSAP. During transfer of the emergency VoIP call, the original RC may or may not remain on the line, but for safety purposes will not likely want to disconnect or cold transfer the emergency call. This is because errors may occur in the transfer, resulting in valuable time lost. One cause of a faulty transfer of the E911 call would be that the VoIP user has not updated the location stored by the VPC, or quite simply that bad routing has occurred. Another cause would be that the nature of the emergency requires multiple parties to be involved (e.g., fire/police, police/FBI, ambulance/CDC, etc.).

Conventional solutions are based on tools that can be used to find the phone numbers of other emergency response centers. The ERC receiving the call initially will perform a look-up for the correct response center, and may dial the identified correct response center, agency, etc., and transfer the call via direct dial/public switched telephone network (PSTN.

One exemplary conventional solution is called an Intelligent Emergency Network (IEN), available from Intrado Inc. of Longmont, Colo. However, such conventional solutions typically require the emergency response center to know the direct dial lines of every PSAP, ESP, ERC, etc. nationally. Moreover, those lines may not always be staffed. Other potential problems would be caused if no automatic location identification (ALI) information is accessible or available.

There is a need for an architecture and methodology that both simplifies the complexity of a VoIP call transfers with respect to an emergency response center such as a public safety access point (PSAP).

SUMMARY OF THE INVENTION

In accordance with the principles of the present invention, a method of connecting an emergency caller with an emergency response center comprises establishing an emergency call conference. The emergency caller is added to the established emergency call conference, and the emergency response center is added to the emergency call conference. The emergency call is established after the emergency caller and the emergency response center are both added to the emergency call conference.

DETAILED DESCRIPTION OF ILLUSTRATIVE EMBODIMENTS

The present invention handles emergency calls through the use of a conference bridge on a VoIP service provider's soft switch. The soft switch works with a VoIP positioning center (VPC) to obtain location information, which may be gathered or confirmed by the initial recipient of the call, to ensure that appropriate participants to the emergency conference call are Invited to join the call. With the present invention in place, any number of emergency calls can be made, including any number of ERCs, PSAPs, ERPs, etc., (limited only by the number of conference bridges that can be established in provisioned equipment, e.g., in the VoIP service provider's soft switch). Cold transfers can be avoided by Inviting participants to join a single emergency conference rather than passing an original call from party to party (e.g., from PSAP to police to ambulance, etc.) Moreover, the emergency call can survive as long as a participant remains in the emergency conference call, even after the original emergency caller hangs up.

Figure 1:
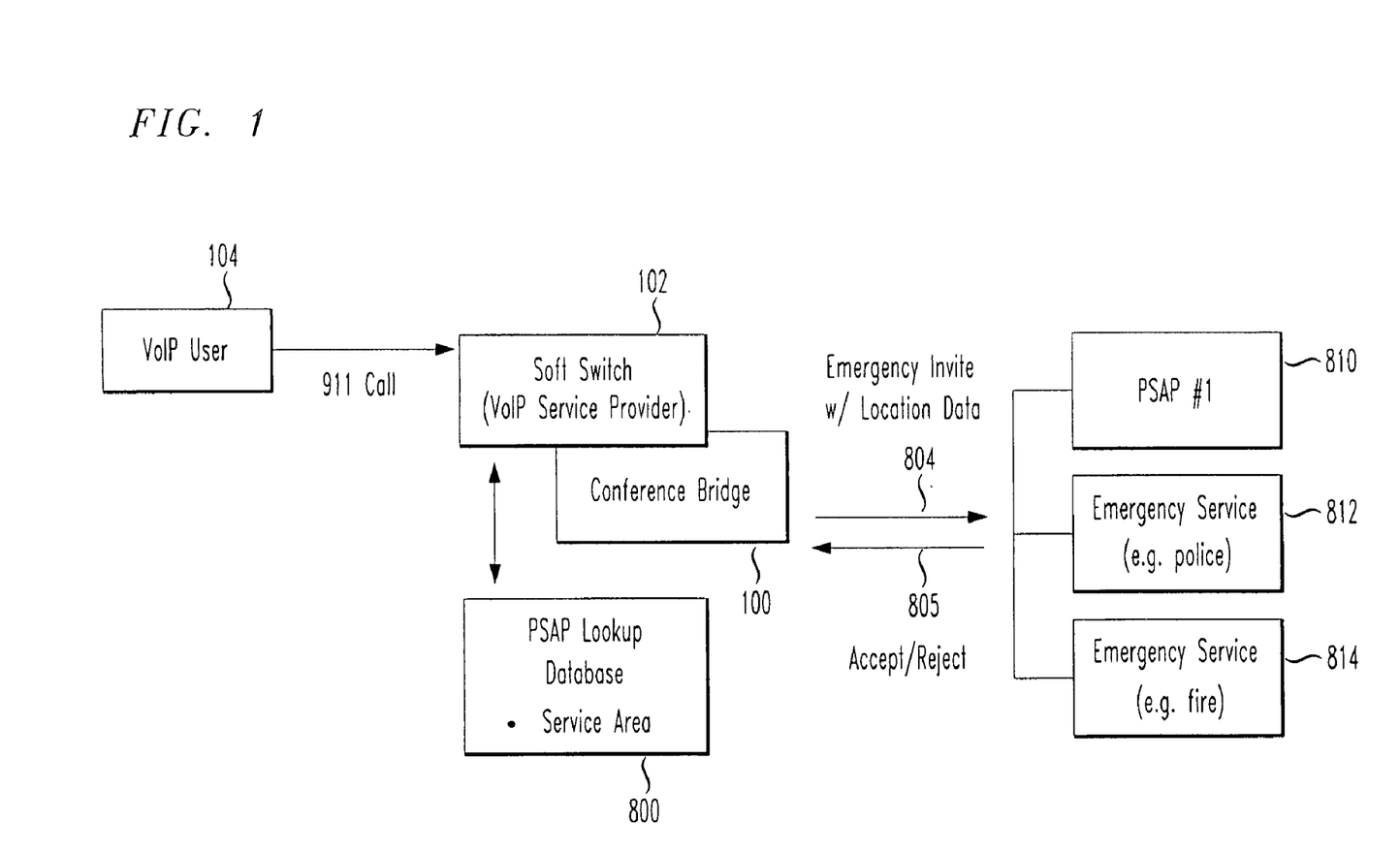
FIG. 1 shows an exemplary architecture of a VoIP emergency call conference bridge application operating in a VoIP soft switch of a VoIP provider to provide VoIP emergency call conferencing, in accordance with the principles of the present invention.

FIG. 1 shows an exemplary architecture of a VoIP emergency call conference bridge application operating in a VoIP soft switch of a VoIP provider to provide VoIP emergency call conferencing, in accordance with the principles of the present invention.

In particular, as shown in FIG. 1, a user of a VoIP communications device 104 makes an emergency call (e.g., a 911 call). The VoIP service provider of the VoIP communications device 104 receives the 911 call, and assigns it to an available VoIP emergency conference call bridge 100. The soft switch 102 obtains location information relating to the VoIP communications device 104, either directly from the VoIP communications device 104 itself (e.g., if it includes a GPS device) or from a VoIP positioning center (VPC). The VoIP soft switch 102 compares the location information in a PSAP lookup database 800 to determine an initial PSAP for the service area responsible for the location of the VoIP communications device 104. The PSAP lookup database provides an appropriate URL or other address information of the initial PSAP to the VoIP soft switch 102, which in turn addresses an Invite message 804 (preferably including location information relating to the location of the VoIP communications device 104). The PSAP 810, in response, sends either an Accept message or a Reject message to the soft switch 102 in response to the Invite message 804. Additional emergency services departments (e.g., police 812, fire 814, etc.) may be subsequently sent an Invite message to join the same VoIP emergency conference call.

Thus, the VoIP communication device 104 dials the appropriate emergency number (e.g., 911), and in response the VoIP service provider's soft switch 102 otherwise responsible for routing the user's calls instead establishes a VoIP conference bridge 100 and places the incoming emergency call into the VoIP conference bridge 100.

Although the initial emergency VoIP communication device 104 is a VoIP device, the soft switch 102 may additionally include interfaces to the Public Switched Telephone Network (PSTN) to permit non-VoIP emergency service provider's to join into the VoIP conference bridge.

Alternatively, instead of automatically placing the initial VoIP emergency caller 104 into the established VoIP conference bridge 100, the VoIP soft switch 102 may instead Invite the initial VoIP emergency caller 104 to join the conference call via the VoIP conference bridge 100. In response, the initial VoIP emergency caller 104 presumably accepts the Invite message and joins the VoIP conference bridge 100.

At this point, the soft switch 102 may confirm location with the initial VoIP emergency caller 104 (if location information was provided with the initial call from the VoIP communication device 104), or determines location from the subscriber's VPC, and captures the Location Object (LO).

The initial VoIP emergency caller 104 sends the LO and a 911 Invite message with an RC type (e.g., Fire Department, Homeland Security, etc.) to the soft switch 102 managing the VoIP conference bridge 100.

The soft switch 102 sends the LO and Invite information to the VPC, which identifies the proper additional conference participant(s) (e.g., a PSAP, RC, first responder, other interested party, etc.) and corresponding contact information, and invites the proper participants to join the call.

The invited participant(s) can also invite other entities to join the VoIP emergency conference. While it is presumed that all participants in the VoIP emergency conference call may participate in the call, it is possible to include 'listen only' participants. For instance, a voice and/or data recording line may be invited to the VoIP emergency conference call to record any data and/or voice conversation.

Figure 2:
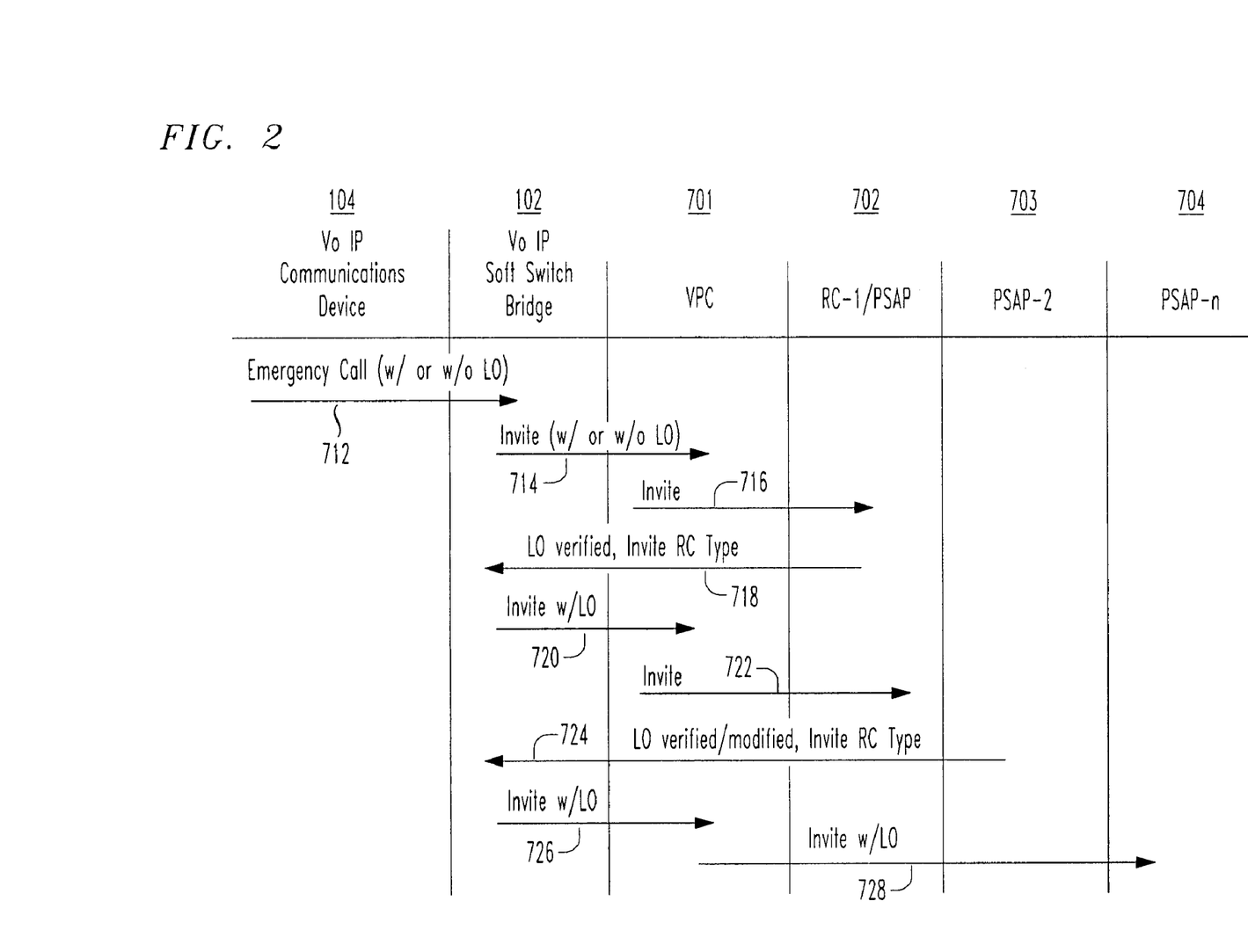
FIG. 2 shows an exemplary message flow diagram of VoIP location based 911 conferencing, in accordance with the principles of the present invention.

FIG. 2 shows an exemplary message flow diagram of VoIP location based 911 conferencing, in accordance with the principles of the present invention.

In particular, as shown in FIG. 2, an emergency call 712 (e.g., 911) is placed from VoIP communications device 104.

In response, the VoIP soft switch establishing the VoIP emergency conference call bridge transmits an emergency VoIP conference call Invite message (with or without a location object) 714 (or other location request) to the VoIP Positioning Center (VPC) 701. Based on the location of the initiating VoIP emergency caller 104, the VPC pass at least one Invite message using Internet Protocol (e.g., over the Internet) to interested third parties such as an initially contacted RC-1/PSAP 702, PSAP-2 703, PSAP-n 704, etc. The first emergency center contacted (RC-1/PSAP 702) responds by verifying the location object and passing the same, along with the Invite RC Type, to the soft switch 718.

As the emergency call progresses, other emergency responders may be brought into the VoIP emergency conference call. For instance, the soft switch that manages the VoIP conference call bridge 100 initiates an Invite message with location object to the VPC 701, which in turn transmits an Invite message 722 to a subsequent emergency response center (e.g., PSAP-2 703). That subsequent emergency response center 703 responds by verifying/modifying the location object, and the Invite RC Type, as shown in message 724.

The VoIP soft switch 102 may continue to invite additional emergency responders (or other parties) by passing an Invite message with location object through the VPC 701, which passes an Invite with location object to the relevant other emergency responders 704.

As an example to explain advantages of the present invention, the scenario is given where an emergency 9-1-1 call is routed to a PSAP based on a presumed or default location of the VoIP caller, but in fact it turns out that the PSAP that receives the VoIP call is not the correct entity to handle emergency calls from the particular location that the VoIP caller is currently at. Such errors may occur, e.g., due to the user not updating the SLDB, bad routing, etc. In this scenario, the initial VoIP communications device dials 9-1-1, a conference line is initiated by the soft switch, an initially determined PSAP receives an Invite message to join the VoIP emergency conference bridge. The PSAP confirms/determines the user's location, and in the given scenario would determine that another PSAP is needed instead of or in addition to the PSAP on the line. In particular, the initial PSAP captures the Location Object (LO) and either rejects the Invite to join the VoIP emergency conference call (and is then removed from the conference bridge) or continues to participate in the VoIP emergency conference call (and so then stays on the conference bridge). Either way, a 911 emergency call Invite message is sent with the LO to the soft switch managing the VoIP emergency conference bridge. The VoIP soft switch sends the LO to the VPC, which then identifies the proper PSAP based on the LO and initiates an Invite message addressed over IP to the proper PSAP to join into the VoIP emergency conference call through the soft switch.

The VoIP conference bridge then joins the proper PSAP to the VoIP emergency conference call with the initial VoIP emergency caller (and with the initially contacted PSAP, if the initially contacted PSAP continues to participate in the call). In this manner, the initial VoIP emergency caller is kept on the line throughout the process, with preferably no additional manual action or key entry required from the initial emergency caller.

At the conclusion of the VoIP emergency call, the VoIP conference bridge is closed.

In cases where the initial routing of the VoIP emergency call was correct, the VoIP conference bridge would still be used, and the initial two parties would participate in the VoIP emergency conference call (e.g., the initial VoIP emergency caller and the initially Invited RC or PSAP). If no other parties are invited, additional queries to the VoIP Positioning Center (VPC) would not be necessary. If additional parties are invited, the soft switch would use location information and RC Type information from the initial RC or PSAP to determine the identity of other relevant RCs and/or PSAPs.

Figure 3:
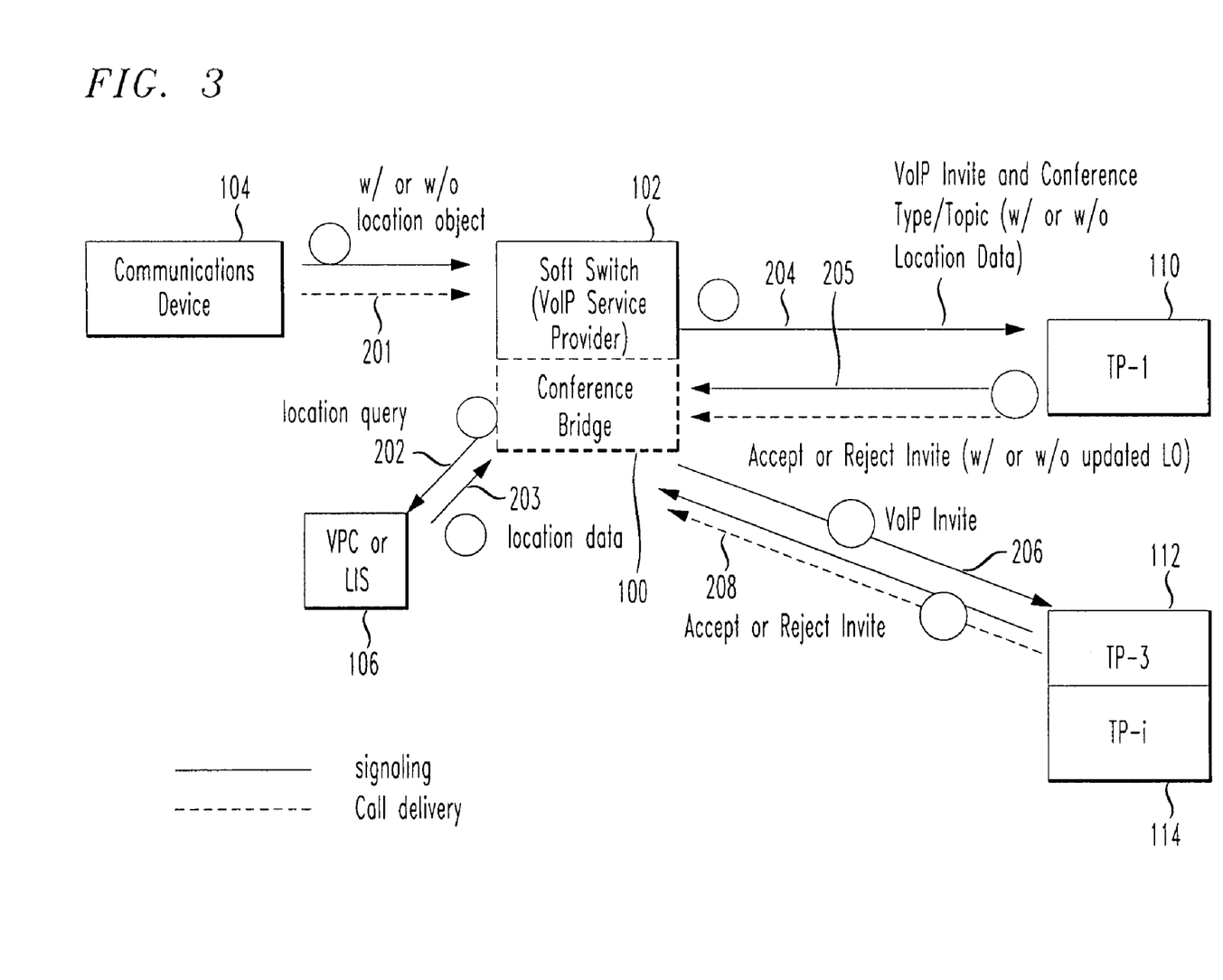
FIG. 3 shows an exemplary architecture of a VoIP conference bridge application operating in a VoIP soft switch of a VoIP provider to provide VoIP emergency call conferencing, in accordance with the principles of the present invention.

In general principle, FIG. 3 shows an exemplary architecture of a VoIP conference bridge application operating in a VoIP soft switch of a VoIP provider to provide VoIP call conferencing, in accordance with the principles of the present invention.

In particular, as shown in FIG. 3, a VoIP communications device 104 is serviced by their service provider's soft switch 102. A positioning center 106 provides location data upon request from the soft switch 102. Other VoIP users 110, 112, 114 etc. are potential members of any given conference.

Conference bridges 100 are implemented on the VoIP soft switch 102 located, e.g., at the VoIP service provider's VoIP network.

While the VoIP soft switch 102 is preferably capable of being provisioned with as many VoIP conference bridges 100 as are required in any particular application, only one conference bridge 100 is shown in FIG. 3 for simplicity of explanation.

Also, while the conference bridge 100 is shown implemented in the soft switch 102, it can be embodied within another suitable network element having an Internet Protocol (IP) type connection (e.g., TCP/IP) with the initial user 104 as well as with the potential conferees 110, 112, 114.

In accordance with the principles of the present invention, location information relating to the initial VoIP user 104 is passed to the VoIP conference bridge 100, either from the user's VoIP communication device 104 or from their respective location server 106. The location information is then compared by the VoIP soft switch 102 to find an initial desired PSAP.

The VoIP soft switch 102 makes use of the location information and other existing data or user input (e.g., existing preferences on file on the Soft Switch 102, user entry through the keypad of the communications device 104, or voice response). Based on the location and user input, the VoIP conference bridge 100 identifies the desired PSAP to be asked or Invited to join the conference currently established by the initial VoIP user 104 on the conference bridge 100, and outputs an Invite or request message 204 to join that conference 100 to the specific URL(s), phone number(s) and/or other identifying address information relating to VoIP communications equipment 110, 112, 114 of the relevant PSAP.

The soft switch 102 may also maintain the attributes and rules from other VoIP communication devices 110, 112, 114 etc. for receiving conference bridge calls, as well as the fixed location (e.g., a place of business) or the ability to query for a current location (e.g., for mobile communication devices such as mobile phones) for each device. Based on this information, with or without other user input (e.g., to select or prioritize among a list of available third parties), the soft switch 102 invites one or more other communication devices 110, 112, 114, etc. to join the conference bridge. This creates a voice link between the first user 104 and the other third parties 110, 112, 114 without requiring the first user 104 to know the contact information or name of the third parties 110, 112, 114.

Figure 4:
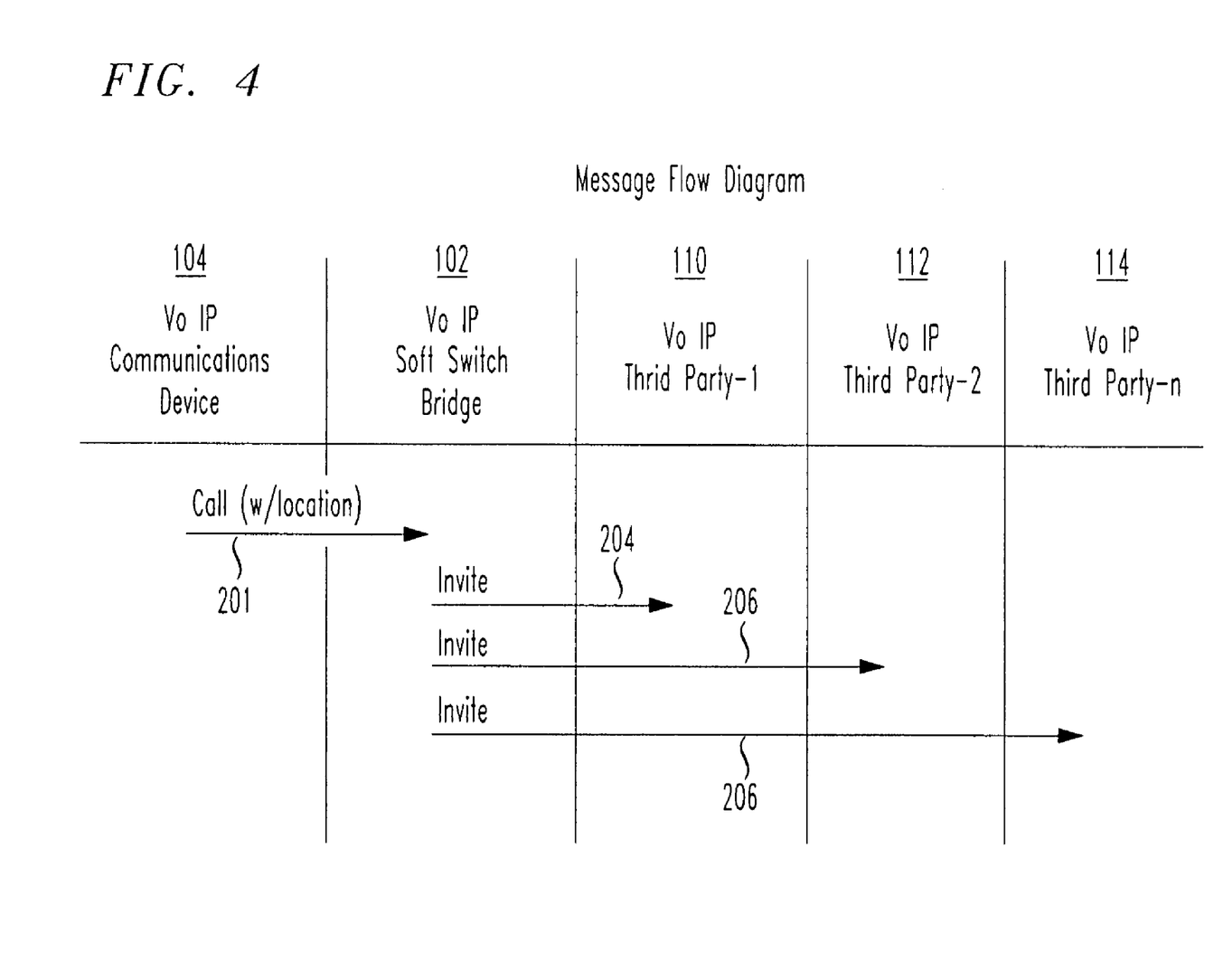
FIG. 4 shows an exemplary message flow diagram for establishing a VoIP location based conference, in accordance with the principles of the present invention.
Figure 5:
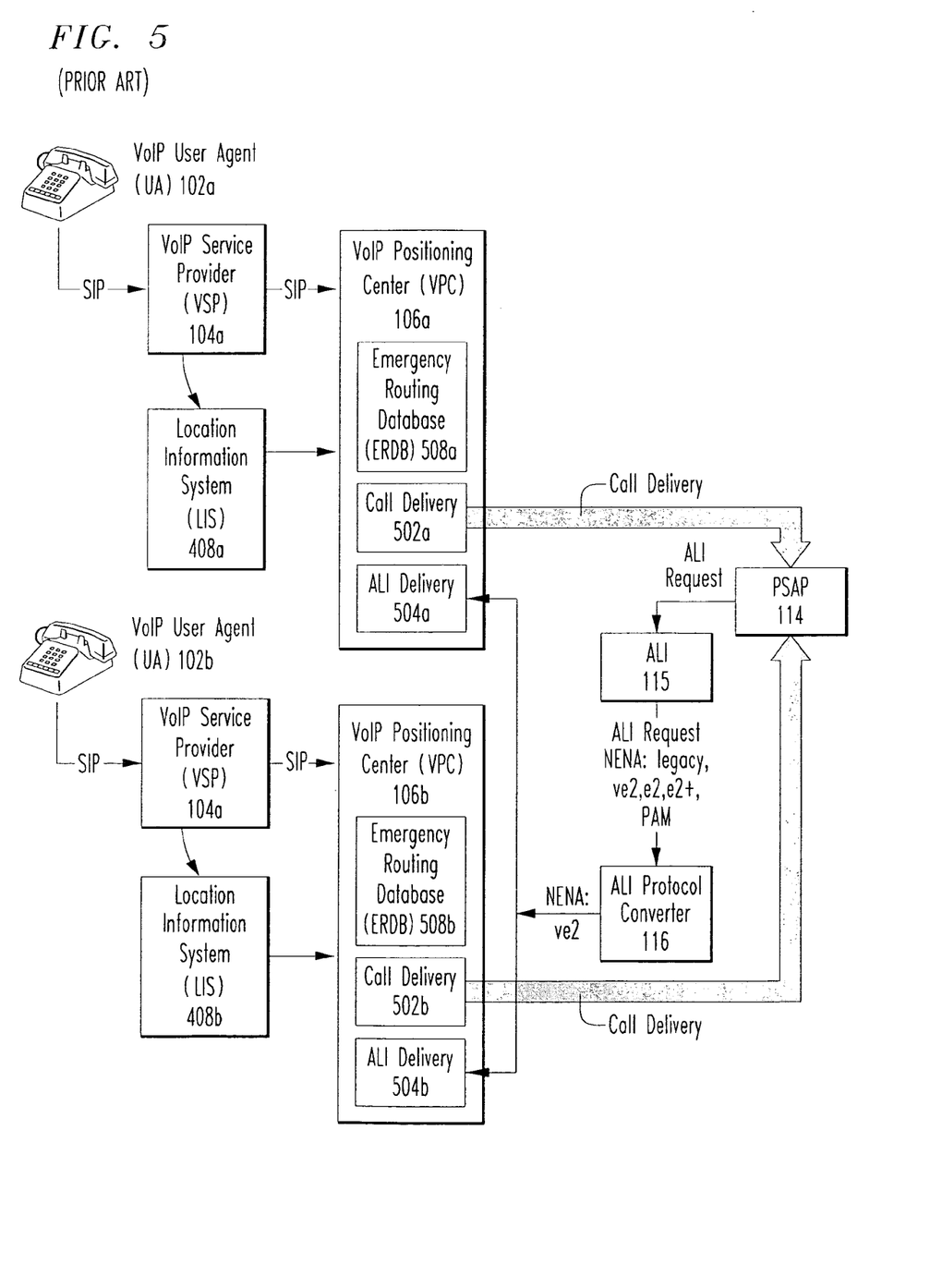
FIG. 5 shows a conventional architecture used to route a VoIP 911 caller's call to a designated public safety access point (PSAP).

FIG. 4 shows an exemplary message flow diagram for establishing a VoIP location based conference, in accordance with the principles of the present invention.

In particular, as shown in FIG. 4, the initial VoIP user 104 sends a request for conference bridge call to the soft switch 102. Preferably the initial VoIP user 104 includes location information with the conference request call 201. However, as depicted in FIG. 3, location information can be obtained from an appropriate positioning server 106 if not available from the initial VoIP user 104.

Subsequent to the incoming conference call 201, a suitable PSAP (and/or other emergency services, including a recorder line) is determined and invited with respective invite messages 204, 206.

In operation, the user's VoIP communication device 104 dials a pre-determined phone number (or URL) of the emergency service (e.g., 911) to initiate a VoIP emergency conference bridge 100 on the relevant VoIP soft switch 102.

FIG. 3 shows use of a VoIP positioning center (VPC) 106. The VoIP soft switch 102 may receive the user's location information either from each of the VoIP communication devices 104, 110, 112, 114 etc., or from the VPC 106.

The VoIP soft switch 102 preferably uses both the location information of the initiating VoIP user 104, together with any profile criteria set for a given conference bridge 100, to determine a suitable PSAP or other emergency services entity to be sent INVITE messages inviting them to join the established VoIP emergency conference bridge 100.

The VoIP soft switch 102 invites one or more other VoIP communication devices 110, 112, 114, (relating to emergency services) to join the VoIP emergency conference bridge 100. This creates a voice link between the initiating VoIP user 104 that initially called into the VoIP emergency conference bridge 100, and the other potential, third party conferees 110, 112, 114, etc., without requiring the initiating VoIP user 104 to know the name or even the contact information of the other potential, third party emergency conferees 110, 112, 114, etc.

Upon receipt of an invite to a VoIP conference bridge 204, 206, the potential other VoIP users 110, 112, 114, etc. (PSAPs) are preferably notified similar to an incoming telephone call, e.g. with a ring signal, though it may be customized to be distinguished from the sound of an otherwise ordinary incoming phone call. For instance, a given unique phone tone may be activated upon receipt of an invite 204, 206 to a conference bridge 100.

In accordance with the principles of the present invention, the VoIP communication device(s) 110, 112, 114 receiving invitations to join a VoIP emergency call conference 100 may be provided with a filter that automatically rejects any/all invite requests not meeting their own specific criteria (e.g., the first invited participant to accept the Invite message) maintained on their VoIP devices 110, 112, 114 themselves, though such filtering may alternatively be performed at a network level, e.g., at the VoIP soft switch 102 or other centralized location.

Benefits of the invention include that there is no effective limit to the number of participants in the VoIP emergency conference call, there are no cold transfers of a call as VoIP invitees enter or leave the conference bridge 100, and there is the ability to continue the conference call even after the initial VoIP user 104 making the emergency call disconnects.

The present invention has particular applicability with any/all VoIP users, VoIP service providers, and Public Safety Access Points (PSAPs).

The invited VoIP users 110, 112, 114 may include a filter allowing through only acceptable Invite messages based on criteria established by or on the receiving VoIP communication devices 110, 112, 114.

The present invention allows VoIP users to efficiently and quickly find and invite their most appropriate responder to their emergency, with minimal user interaction. This is particularly helpful for mobile VoIP users (e.g., while driving, walking, etc.) Moreover, there is no effective limit to the number of participants in the conference call (within network hardware limits of the conference bridge itself). There is also no risk of cold transfers of a VoIP telephone call as participants aren't handled in point-to-point connections that are transferred but rather join or exit an established conference at will. Furthermore, emergency personnel from various departments and locations in the conference call can continue in the conference even after the initial emergency caller disconnects.

Potential markets for the present invention include VoIP service providers who may implement the inventive VoIP emergency conference calling as a value added services for users. VoIP location based conferencing in accordance with the principles of the present invention has particular applicability with any/all VoIP users, VoIP service providers, and Public Safety Access Points (PSAPs).

While the invention has been described with reference to the exemplary embodiments thereof, those skilled in the art will be able to make various modifications to the described embodiments of the invention without departing from the true spirit and scope of the invention.

What is claimed is:

1. A method of connecting an emergency call using a Voice over Internet Protocol (VoIP) device with an emergency response center, comprising:
    establishing an intermediary Voice-over-Internet Protocol (VoIP) emergency call conference bridge;
    assigning a "9-1-1" emergency call using said VoIP device to said intermediary VoIP emergency call conference bridge;
    adding an emergency response center to said intermediary VoIP emergency call conference bridge chosen based on a location of said VoIP device; and
    adding a VoIP emergency responder to said intermediary VoIP emergency call conference bridge;
    wherein said intermediary VoIP emergency call conference bridge maintains control of said "9-1-1" emergency call for a duration of said "9-1-1" emergency call.

2. The method of connecting an emergency call using a Voice over Internet Protocol (VoIP) device with an emergency response center according to claim 1, further comprising:
    adding another VoIP emergency responder to said intermediary VoIP emergency call conference bridge.

3. The method of connecting an emergency call using a Voice over Internet Protocol (VoIP) device with an emergency response center according to claim 2, wherein said emergency responder comprises:
    a police dispatcher.

4. The method of connecting an emergency call using a Voice over Internet Protocol (VoIP) device with an emergency response center according to claim 2, wherein said emergency responder comprises:
    a fire department.

5. The method of connecting an emergency call using a Voice over Internet Protocol (VoIP) device with an emergency response center according to claim 2, wherein said emergency responder comprises:
    an ambulance company.

6. The method of connecting an emergency call using a Voice over Internet Protocol (VoIP) device with an emergency response center according to claim 1, further comprising:
    adding at least three VoIP emergency responders to said intermediary VoIP emergency call conference bridge at a beginning of said "9-1-1" emergency conference call.

7. The method of connecting an emergency call using a Voice over Internet Protocol (VoIP) device with an emergency response center according to claim 1, wherein said emergency response center comprises:
    a public safety access point (PSAP).

8. The method of connecting an emergency call using a Voice over Internet Protocol (VoIP) device with an emergency response center according to claim 1, wherein:
    said "9-1-1" emergency call is added to said intermediary VoIP emergency call conference bridge after said emergency response center is added to said intermediary VoIP emergency call conference bridge.

9. The method of connecting an emergency call using a Voice over Internet Protocol (VoIP) device with an emergency response center according to claim 1, wherein:
    said emergency response center is added to said intermediary VoIP emergency call conference bridge after said "9-1-1" emergency call is added to said intermediary VoIP emergency call conference bridge.

* * * * *